United States Patent
Poulis et al.

(10) Patent No.: US 12,174,903 B1
(45) Date of Patent: Dec. 24, 2024

(54) SEARCH SYSTEM AND METHOD HAVING QUALITY SCORING

(71) Applicant: Seekr Technologies Inc., Vienna, VA (US)

(72) Inventors: Stefanos Poulis, Vienna, VA (US); Robin K. Clark, Vienna, VA (US); Patrick K. Condo, Vienna, VA (US)

(73) Assignee: Seekr Technologies Inc., Vienna, VA (US)

( * ) Notice: Subject to any disclaimer, the term of this patent is extended or adjusted under 35 U.S.C. 154(b) by 0 days.

(21) Appl. No.: 18/582,111

(22) Filed: Feb. 20, 2024

Related U.S. Application Data

(63) Continuation of application No. 18/220,437, filed on Jul. 11, 2023.

(51) Int. Cl.
| | |
|---|---|
| G06F 7/02 | (2006.01) |
| G06F 16/00 | (2019.01) |
| G06F 16/951 | (2019.01) |
| G06F 16/9535 | (2019.01) |
| G06F 16/9538 | (2019.01) |

(52) U.S. Cl.
CPC ........ *G06F 16/9538* (2019.01); *G06F 16/951* (2019.01); *G06F 16/9535* (2019.01)

(58) Field of Classification Search
CPC . G06F 16/9538; G06F 16/9535; G06F 16/951
See application file for complete search history.

(56) References Cited

U.S. PATENT DOCUMENTS

| | | | |
|---|---|---|---|
| 5,696,962 | A | 12/1997 | Kupiec |
| 5,909,510 | A | 6/1999 | Nakayama |
| 6,026,388 | A | 2/2000 | Liddy et al. |
| 6,119,114 | A | 9/2000 | Smadja |
| 6,226,668 | B1 | 5/2001 | Silverman |
| 6,601,075 | B1 | 7/2003 | Huang et al. |
| 6,651,057 | B1 | 11/2003 | Jin et al. |
| 6,807,565 | B1 | 10/2004 | Dodrill et al. |
| 6,847,969 | B1 | 1/2005 | Mathai et al. |
| 6,990,514 | B1 | 1/2006 | Dodrill et al. |
| 7,062,485 | B1 | 6/2006 | Jin et al. |
| 7,076,484 | B2 | 7/2006 | Dworkis et al. |
| 7,120,925 | B2 | 10/2006 | D'Souza et al. |
| 7,197,497 | B2 | 3/2007 | Cossock |
| 7,240,067 | B2 | 7/2007 | Timmons |

(Continued)

FOREIGN PATENT DOCUMENTS

WO    WO/0077690 A1    12/2000

OTHER PUBLICATIONS

Baulepur, "Aligning Language Models with Factuality and Truthfulness" Thesis submitted in partial fulfillment of Bachelor of Science in Computer Science, University of Illinois At Urbana-Champaign, 2023, 50 pages.

(Continued)

*Primary Examiner* — Bruce M Moser
(74) *Attorney, Agent, or Firm* — Manatt, Phelps & Phillip

(57) ABSTRACT

A search system and method generates a quality score and/or a political lean score for a piece of content and returns the one or more scores to the user when returning search results from a query to the user. In one embodiment, the system and method may use artificial intelligence/machine learning to determine the one or more scores for each piece of content.

21 Claims, 10 Drawing Sheets

(56) References Cited

U.S. PATENT DOCUMENTS

| | | |
|---|---|---|
| 7,313,622 B2 | 12/2007 | Lee et al. |
| 7,475,404 B2 | 1/2009 | Hamel |
| 7,516,123 B2 | 4/2009 | Betz et al. |
| 7,606,810 B1 | 10/2009 | Jeavons |
| 7,827,125 B1 | 11/2010 | Rennison |
| 7,836,060 B1 | 11/2010 | Rennison |
| 7,870,117 B1 | 1/2011 | Rennison |
| 7,925,973 B2 | 4/2011 | Allaire et al. |
| 7,933,893 B2 | 4/2011 | Walker et al. |
| 8,001,064 B1 | 8/2011 | Rennison |
| 8,060,518 B2 | 11/2011 | Timmons |
| 8,195,666 B2 | 6/2012 | Jeavons |
| 8,219,911 B2 | 7/2012 | Clarke-Martin et al. |
| 10,733,452 B2 | 8/2020 | Attorre |
| 2001/0021934 A1 | 9/2001 | Yokoi |
| 2002/0007393 A1 | 1/2002 | Hamel |
| 2002/0062340 A1 | 5/2002 | Kloecker et al. |
| 2002/0095336 A1 | 7/2002 | Trifon et al. |
| 2002/0147578 A1 | 10/2002 | O'Neil et al. |
| 2002/0169669 A1 | 11/2002 | Stetson et al. |
| 2002/0169771 A1 | 11/2002 | Melmon et al. |
| 2003/0191816 A1 | 10/2003 | Landress et al. |
| 2003/0212954 A1 | 11/2003 | Patrudu |
| 2003/0217052 A1 | 11/2003 | Rubenczyk et al. |
| 2004/0049574 A1 | 3/2004 | Watson et al. |
| 2004/0117400 A1 | 6/2004 | McCrystal et al. |
| 2005/0091200 A1 | 4/2005 | Melton et al. |
| 2005/0188402 A1 | 8/2005 | de Andrade et al. |
| 2006/0031419 A1 | 2/2006 | Huat |
| 2006/0047632 A1 | 3/2006 | Zhang |
| 2006/0117348 A1 | 6/2006 | D'Souza et al. |
| 2007/0033531 A1 | 2/2007 | Marsh |
| 2007/0038567 A1 | 2/2007 | Allaire et al. |
| 2007/0038931 A1 | 2/2007 | Allaire et al. |
| 2007/0260671 A1 | 8/2007 | Harinstein et al. |
| 2008/0010142 A1 | 1/2008 | O'Brien et al. |
| 2008/0104113 A1 | 5/2008 | Wong |
| 2008/0221983 A1 | 9/2008 | Ausiannik et al. |
| 2009/0024574 A1 | 1/2009 | Timmons |
| 2009/0197581 A1 | 8/2009 | Gupta et al. |
| 2009/0248668 A1 | 10/2009 | Zheng |
| 2010/0100545 A1 | 4/2010 | Jeavons |
| 2010/0313116 A1 | 12/2010 | Hyman |
| 2011/0166918 A1 | 7/2011 | Allaire et al. |
| 2011/0191163 A1 | 8/2011 | Allaire et al. |
| 2012/0078895 A1 | 3/2012 | Chu-Carroll |
| 2012/0143792 A1 | 6/2012 | Wang |
| 2013/0318063 A1 | 11/2013 | Ayzenshtat |
| 2016/0021037 A1 | 1/2016 | Hewitt |
| 2018/0101534 A1 | 4/2018 | Alexander, Jr. |
| 2019/0065744 A1 | 2/2019 | Gaustad |
| 2019/0082224 A1 | 3/2019 | Bradley |
| 2019/0147062 A1 | 5/2019 | Kim |
| 2019/0163327 A1* | 5/2019 | Otero .................. G06F 3/0482 |
| 2020/0125639 A1 | 4/2020 | Doyle |
| 2020/0126533 A1 | 4/2020 | Doyle |
| 2021/0004420 A1 | 1/2021 | Mittal |
| 2021/0019339 A1* | 1/2021 | Ghulati ................ G06N 20/00 |

OTHER PUBLICATIONS

Azaria, et al., "The Internal State of an LLM Knows When its Lying", School of Computer Science, Ariel University, Israel and Machine Learning Dept., Carnegie Mellon University, Pittsburgh, PA, Apr. 2023, 10 pages.

Lee, et al., "Linguistic Properties of Truthful Response," University of Pennsylvania, PA, USA., Jun. 2023, 6 pages.

Poulis, "Algorithms for Interactive Machine Learning", Dissertation submitted in partial fulfillment of degree of Doctor of Philosophy in Computer Science, University of California, San Diego, 2019, 148 pages.

Yang, et al., "RefGPT: Reference—Truthful & Customized Dialogues Generation by GPTs and for GPTs", Shanghai Jiao Tong University, Hong Kong Polytechnical University, Beijing University of Posts and Telecommunications, May 2023, 20 pages.

Pan, et al., "On the Risk of Misinformation Pollution with Large Language Models", National University of Singapore, University of California, Santa Barbara, University of Waterloo, MBZUAI, Zhejiang University, May 2023, 14 pages.

McKenna, et al., "Sources of Hallucination by Large Language Models on Inference Tasks", University of Edinburgh, Google Research, Macquarie University, May 2023, 17 pages.

\* cited by examiner

| score | name |
|---|---|
| 1 | domain_transparency.leadership |
| 0.2 | incoherence |
| 0 | obituary |
| 0.5 | domain_transparency.fact_checking |
| 0 | subjectivity |
| 0.7 | domain_transparency.overall_score |
| 1 | domain_transparency.ethics |
| 1 | domain_transparency.contact_newsroom |
| 0 | clickbait |
| 0.1 | ad_hominem |
| 0.5 | domain_transparency.policy_accessibility |
| 1 | domain_transparency.sources |
| 0 | no_byline |
| 0.5 | domain_transparency.ownership |
| 0 | domain_transparency.author_info |
| 0 | title_exaggeration |
| 1 | domain_transparency.corrections |
| 0.5 | domain_transparency.mission |
| 0.5 | beat_reporting |
| 1 | domain_transparency.type_of_work |
| 1 | domain_transparency.diversity |

FIGURE 9

SEARCH SYSTEM AND METHOD HAVING QUALITY SCORING

PRIORITY CLAIMS/RELATED APPLICATIONS

This application is a continuation of and claims priority under 35 USC 120 to U.S. patent application Ser. No. 18/220,437 filed Jul. 11, 2023, the entirety of which is incorporated herein by reference.

FIELD

The disclosure relates to search systems and method that receive a query and return search results with quality scores.

BACKGROUND

A search engine is part of everyday life in which a user searches for information about a topic, a product and the like. The Google® search website is the most well known search engine. However, most search engines adjust search results that may be returned to the user in ways that may not be apparent to the user. For example, a user would reasonable expect that the best search results would appear at the top of the search results page. However, that is not the case due to sponsored advertisements and the like. For example, the Google® search results may have one or more sponsored web-sites/ads at the top of each search results page based on the query terms of the search. These may or may not be the most relevant results based on the initial query.

Most search engines return results based on an algorithm that parses the query terms and returns results based on those query terms. Most search engines do not perform any quality check on the search results and expect a user to assess the quality of the story/article, etc. especially for stories, articles, etc. about hot topics. The quality of the reporting may be influenced by persuasive techniques so that the reader is guided towards a particular point of view of the author of the story, contradictions in the story that evidence inconsistencies in the story and clickbait techniques that are solely intended to get the reader to click on a link to something else. For most search engines, the reader may be totally unaware of the poor quality of the story and in fact think that it is of high quality. It is desirable to be able to assess the quality of each story for the reader and provide an assessment of the article quality to the reader when the search results are returned to the user.

In addition to the story quality, most stories and articles returned in search results today are written with a bias or written from a particular political perspective. For example, most articles written about former president Donald Trump are written by authors aligned with Donald Trump and authors who despise Donald Trump. Even articles that are not political or about a political issue may be written with a political slant/lean. It is often difficult for a reader to determine the political lean of each article without reading through the article. Thus, like the quality of the story, it is desirable to be able to assess the political lean of each story for the reader and provide an assessment of the political lean of each story to the reader when the search results are returned to the user.

Thus, it is desirable to provide a search engine system that uses technology and provides a technical solution and provides an assessment of the quality of the story and an assessment of the political lean of the story that are provided to the user with the search results and it is to this end that the disclosure is directed.

BRIEF DESCRIPTION OF THE DRAWINGS

FIG. 9 illustrates an example of the scores for a Reuters article by the different ML models for each journalistic principle.

DETAILED DESCRIPTION OF ONE OR MORE EMBODIMENTS

Figure 1:
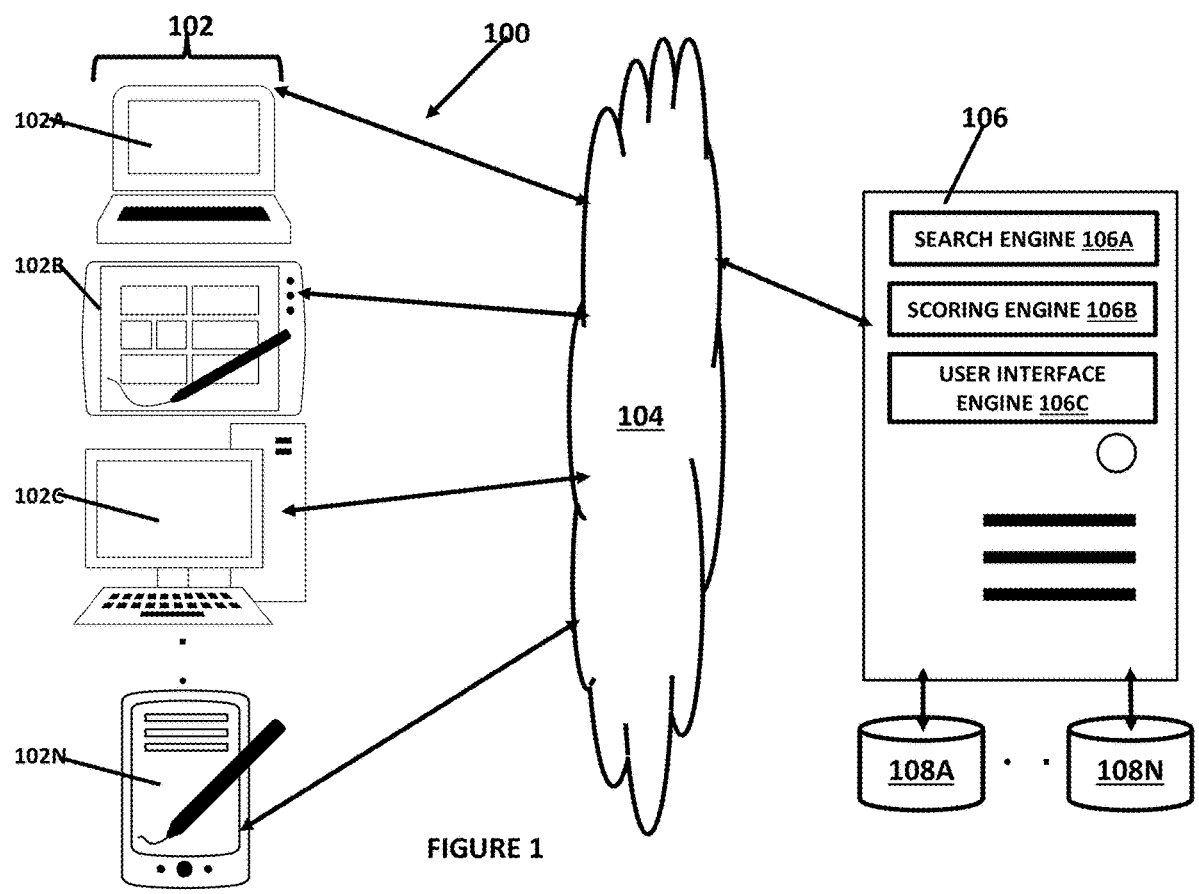
FIG. 1 is a block diagram of a search system that provides a quality assessment and political lean assessment for each piece of content returned as search results.

The disclosure is particularly applicable to a consumer facing search engine that generates a quality assessment and political lean assessment using machine learning techniques for each piece of content returned in search results to a consumer in which each user accesses/communicates with a search engine backend over the Internet and results are returned to each user in a client/server architecture and it is in this context that the disclosure will be described. The political lean score for a piece of content may be indicative of a political bias of the piece of content based on its substance and how it is written. The quality score for each piece of content scores each piece of content against a plurality of factors that assess the quality of the piece of content. It will be appreciated, however, that the search system and method may be implemented using different computer architectures such as a software as a service (SAAS) architecture or other known or yet to be developed computer system architectures. Furthermore, the search system and method may be a standalone system accessed over the web by users as shown in FIG. 1, but may also be embedded/part of a larger system. The search system and method may be used to search any type of content and return results although, for illustration purposes, article/news story results (collectively articles) will be discussed to illustrate the quality assessment and political lean assessment. It should also be noted that the search engine results in response to a query may include results that have the quality and political lean assessments as well as results that do not have those assessments.

The search engine system and method disclosed below may have various technical features including the news article quality scoring (to generate the quality assessment), political lean detection (to generate the political lean assessment), large scale document scoring, AI-based quality scoring, explainable AI, AI-based assessment of adherence to journalistic principles, fake news detection, political bias detection and multi-modal (text-image) learning. These technical features provide a technical solution to a technical problem that cannot be achieved by a human being.

The search system and method provides many technical solutions and benefits over known conventional search systems and these benefits are not achievable by a human being and require technology. The benefits include accuracy Improvements over benchmark open-source datasets for most scoring detectors and accuracy for all detectors has increased over time by utilizing richer datasets, more domain experts and several data augmentation techniques. Furthermore, the latency of the. system has decreased tremendously since its inception after improvements in system architecture and new hardware addition. The system also guides usage of search results (news and web), can educate users about potential issues behind search results they consume and allow the user to have a holistic view of search results in understanding the quality and/or political lean. The system allows users to select and view articles of low, medium, high quality, left, center, right political leaning. The system also may organize/rank/filter results depending on user's needs (by score, by lean, by topic).

FIG. 1 is a block diagram of a search system 100 that provides a quality assessment and political lean assessment for each piece of content returned as search results using technical solutions that achieve the benefits for users set forth above. Like other known search engines, a user may use a computing device 102 to connect to, communicate with and access a search system 106 over a communications path 104 in order to perform a keyword search or browse certain categories of searches. Thus, the user connects to and communicates with the search system 106 (to convey the keywords or category), the search system 106 performs the search and/or returns search results in the form of links to pieces of content in which each piece of content may include a quality score and/or a political lean score that are generated by the search system 106 for a keyword search (or pre-generated if the user selects a category of results) and returned to the user in a user interface that includes links to each piece of content and the quality score and/or the political lean score. The quality score and/or the political lean score are generated in the same manner for both the keyword search and the pre-assigned categories of search results as described below in more detail.

The system 100 may have a plurality of computing devices 102A, 102B, 102C . . . , 102N that can each independently access the search system 106 over the communications path 104. Each computing device may have a processor, memory, wireless or wired connectivity circuits to connect to the search system 106 and a display wherein the memory stores a known browser application, such as Google® Chrome®, etc., that is a plurality of lines of instructions executed by the processor that allows the user to interact with the search system 106. The search system 106 may send back HTML pages with the search results that are converted into a user interface by the browser and displayed on the display of the computing device (examples of the user interface are shown in FIGS. 4-8.) As shown in FIG. 1, each computing device 102 may be a laptop computer 102A. a tablet computer 102B, a personal computer 102D, a smartphone device 102N or any other device that is capable of connecting to and communicating with the search system 106. The communications path 104 may a wireless and/or wired path that may be secure or unsecure.

The search system 106 may be implemented by one or more computing resources, such as server computers, blade servers, cloud computing resources, etc. that have at least one processor and memory that store and execute a plurality of lines of instructions/computer code to perform the search and scoring operations of the search system 106. The search system may further have a search engine 106A, a scoring engine 106B and a user interface engine 106C, each of which may be a plurality of lines of instructions/computer code executed by the processor. The search engine 106A may perform the search engine operations to parse a keyword query, perform the search and return the one or more pieces of content that form the search results in a well-known manner. The scoring engine 106B may perform a quality rating and/or political lean scoring process to generate either/both of the quality score and the political lean score that are discussed below in more detail with reference to FIG. 2. The user interface engine 106C collects the search results or categories and the quality score and/or political lean score and send those back to each computing device is response to the request from each computing device in a well-known manner. The search system 106 may have one or more hardware or software storage 108A, . . . , 108N that store the data used for the searches including the software for the various engines, user data, data used to perform the quality and/or political lean assessments.

Figure 2:
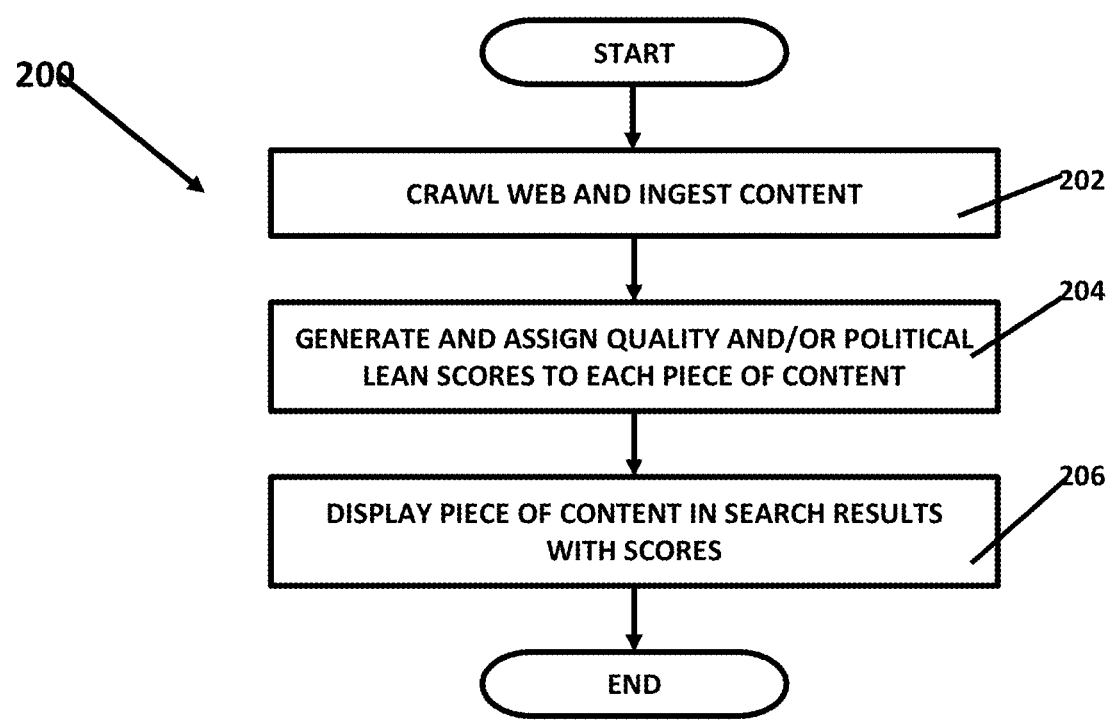
FIG. 2 illustrates a method for providing search results with quality and/or political lean scores.

FIG. 2 illustrates a method 200 for providing search results with quality and/or political lean scores. The method 200 may be performed by the system in FIG. 1, but may also be performed using other systems and hardware that can perform the processes. In the method, a search engine/search system may crawl the web (202) and ingest the various pieces of content that may include web pages, articles, PDF files, word documents and/or any other type of content. In one embodiment, each piece of content may be a piece of news. The method, for each piece of ingested content, may generate and assign a quality score and/or a political lean score (204). In one embodiment, this process 204 may be performed by the scoring engine 106B in FIG. 1. In addition, if a new piece of content or a piece of content that has not been ingested already is a result of a search query, the method may perform on the fly scoring of the piece of content using the same scoring methodology that will be discussed below in more detail with reference to FIG. 3. Then, the method, in response to the search query may display search results (or categories of results) wherein each search result has a squib (image and summary of piece of content) along with one or more scores (206) wherein the scores may be a quality score and/or a political lean score. Examples of these displayed results are shown in FIGS. 4-8 discussed below in more detail.

Figure 3:
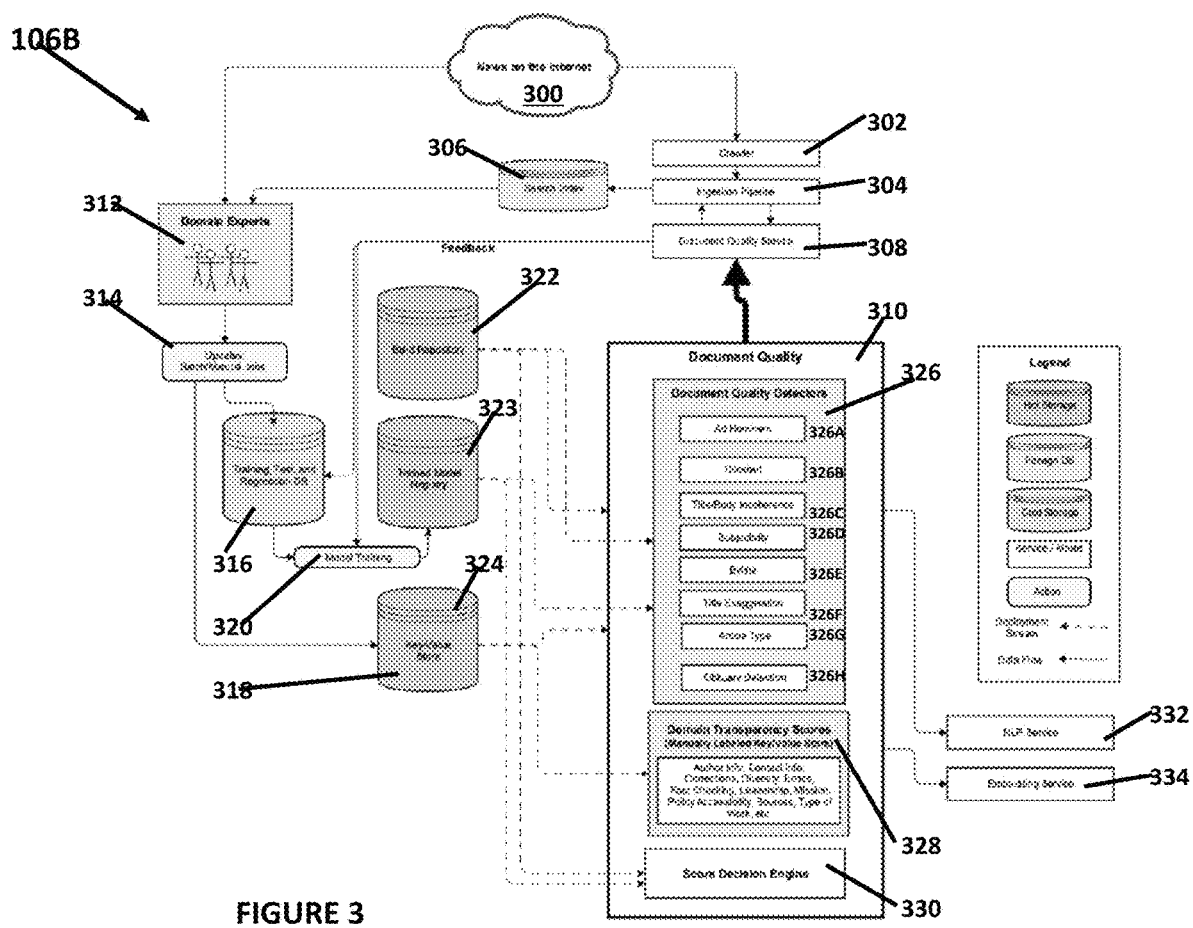
FIG. 3 illustrates more details of the search engine backend shown in FIG. 1.

FIG. 3 illustrates more details of the search engine backend and in particular the scoring engine 106B shown in FIG. 1. The scoring engine 106B may gather pieces of content, such as news pieces of content, from a corpus 300, such as the Internet with the objective to be able to assess the quality and/or political lean of each piece of content in a programmatic manner. The objective is achieved by technical solutions discussed below that include document quality detectors 326 broken down as a set of journalistic principles, each solved individually, detecting political bias of the article, using domain expertise (trained data journalist(s)) to teach the system how to score the pieces of content and then use principles from machine teaching, where experts interact with the model, correct its mistakes, iterate so that the machine learning model(s) used to score the pieces of content learns and becomes better at accurate scoring each piece of content. The scoring engine 106B may use explainable artificial intelligence (AI) that uses novel techniques to explain the system's prediction to the teacher, to allow for easy corrections and bias detection. The scoring engine 106B may be trained on carefully designed datasets, build in-house, using aforementioned expertise.

The scoring engine 106B and models therein are designed to emulate the process of a highly trained journalist. The models may be trained on proprietary datasets curated by expert journalists and linguists and utilize vector representations yielded by language models. In one implementation, the one or more models may be transformer-based architectures and recurrent long-short term memory neural networks that utilize custom attention mechanisms. Attention mechanisms are used to carefully compare the title with the content of the article and detect violations of journalistic principles like clickbait, subjectivity, ad hominem, attacks, quality and type of the sources cited in the article, just as a human expert would do. The one or more models may use different extractive summarization algorithms to enable assessing the degree of relevance of detected violations to the main content of the article and inform the scoring. The one or more models may use a stance detection algorithms to evaluate the stance towards an individual or a topic. Some models may be applied at the sentence level, where a vector representation of each sentence is passed through a neural network model that produces a probability of a violation for that sentence. The sentence level score are collected over all sentences and use different known aggregation algorithms to produce a score over the whole article.

The degree of violation of each journalistic principle is used to give a quality score to each article. In one implementation, the final overall scoring model may be a tree-ensemble architecture trained on set of teaching scenarios curated by journalists. The tree-model has learned from the teaching scenarios to adapt to the non-linear dependencies that may exist in news content. For example, subjectivity is expected in certain article types like Op-eds. On the other hand, subjectivity should be penalized heavily in breaking news articles that are straight reporting.

The pieces of content in the corpus 300 may be gathered using a well-known crawler 302 that feeds the pieces of content into an ingestion pipeline 304. The ingestion pipeline 304 may be based on a pub sub flow, wherein articles flow from on step to the next. The ingestion pipeline 304 is designed to auto scale to be able to cope with the incoming load and backpressure. The ingestion pipeline 304 also may feed the pieces of content to a search index 306 that stores them. The ingestion pipeline 304 may also feed the pieces of content to a document quality service engine 308 that also returns the scored pieces of content to the ingestion pipeline 304 so that the scored pieces of content may be stored in the search index database 306. Each piece of content may be scored by a document quality engine 310 as discussed below.

The scoring engine 106B may use one or more domain experts 312 to train the ML and AI processes based on the corpus 300 and the search index 306. In addition, sampling techniques using known active learning algorithms may be used to sample informative data points to annotate. For example, the domain experts 312 may manually review some pieces of content that the active learning algorithm finds to be informative and useful for the learning machine and score them for either/both quality or political lean (314) and store them in a training, test and regression database 316. Then a model training pipeline (316) is activated to produce a model that is stored in a model registry (323). Automatic or manual batch jobs can then be activated (314) to test the models against a training, test DB and track regressions on previously annotated samples. Model configurations and parameters are stored into a key-value store 324. These parameters and configurations are fetched when models are deployed in production and begin scoring live documents that have not been seen during training. The training data in the training database 316 may be used for model training 320 along with any feedback from the document quality service 308. The feedback may also be input to the training database 316.

The feedback to models may include fully annotated samples, words, expressions or features (feature feedback) that the models will learn from. Specific known feedback algorithms are employed to force the models focus on the semantic dimensions that are important. The feedback may also be model-mistake specific, wherein the expert may provide feedback on a specific mistake to correct the models' prediction. The feedback may also be in the form of a labeling function, wherein the teacher may supply a rule to weakly label data points in bulk. The expert may also be able to look at the models gradient vector and further establish areas where the models need further training.

The trained models may be stored in a trained model registry 323. The trained models are then used to perform the scoring processes. In one implementation, the system uses several machine learning models, one for each task and the output of each model is combined using a known meta-learning machine learning model with a model that maps all the outputs into a single quality score. As shown in FIG. 3, the scoring engine 106B also may have a build repository 322 that stores the data and code/instructions that are used to train and build the models used by the system including the meta-learning machine learning model.

The scoring engine 106B, using the trained model(s) may be used in document quality detectors 326 to determine the quality score of each piece of content based on a number of different metrics. In one implementation, the system may include different machine learning (ML) algorithms for detecting violations of different journalistic principles. For example, the document quality detectors 326 may include an Ad Hominem detector 326A that detects a piece of content directed to an attack on a person instead of the positions of that person, a clickbait detector 326B that detects whether the title of the piece of content appeals to curiosity or emotion instead of describing the story, a Title/Body Incoherence detector 326C that detects a degree of incoherence between the article's title and the article's body (e.g., that the body is directed to a particular subject while the title might be written to be clickbait), a subjectivity detector 326D that detects that the piece of content expresses points of view that go beyond reporting facts, a byline detector 326E that detects if the piece of content has a byline naming the author(s) or not, a title exaggeration detector 326F that detects if the title of the piece of content overstates aspects of the piece of content, an article type detector 326G that detects the type of the piece of content, such as news, opinion, etc., an obituary detector 326H that detects if the piece of content is an obituary and a source attribution detector (not shown in FIG. 3) that evaluates the quality of the sources (on record, off record, background) within the article. The detectors may also detect if the piece of content is s personal attack piece of content in which a person is attacked rather than arguments presented and detect lack of site disclosure for the website that published the piece of content since website that do not share their mission, ownership and policies may be less reliable. In addition to the detectors shown, the document quality 310 may also assess the political leaning of a piece of content wherein the piece of content may have no political lean, right lean, left lean or center lean as determined by a training model that is able to differentiate/classify the different political leanings of the piece of content.

The scoring engine 106B may also include a domain transparency score engine 328 that assesses the information about the source/website of each piece of content including author info, diversity, ethics, leadership, policy accessibility, etc. as shown in FIG. 3 to assess a level of site disclosure of the source of each piece of content that is one of the scores that is part of the overall quality score. The scoring engine 106B may also include a score decision engine 330 that receives all of the scores from the detectors 326 and domain transparency scoring 328 and generates an overall quality score as is shown in the user interfaces shown in FIGS. 4-8. The ML algorithm/model that is used to generate the score is a tree-based ensemble that is trained on carefully curated set of teaching scenarios.

The scoring engine 106B may also include a natural language processing service 332 and a embedding service 334 that receive the output from the document quality engine 310. Thus, using trained ML models, the scoring engine 106B crawls the Internet, gathers pieces of content and generates a quality score and a political lean score for each piece of content all of which is then stored in the search index 306 to be retrieved when a search result for a query matches to the piece of content. The query parsing and matching process is known and operates in a typical manner. In some embodiments, the system may provide its scored pieces of content to third party search engines.

Figure 4:
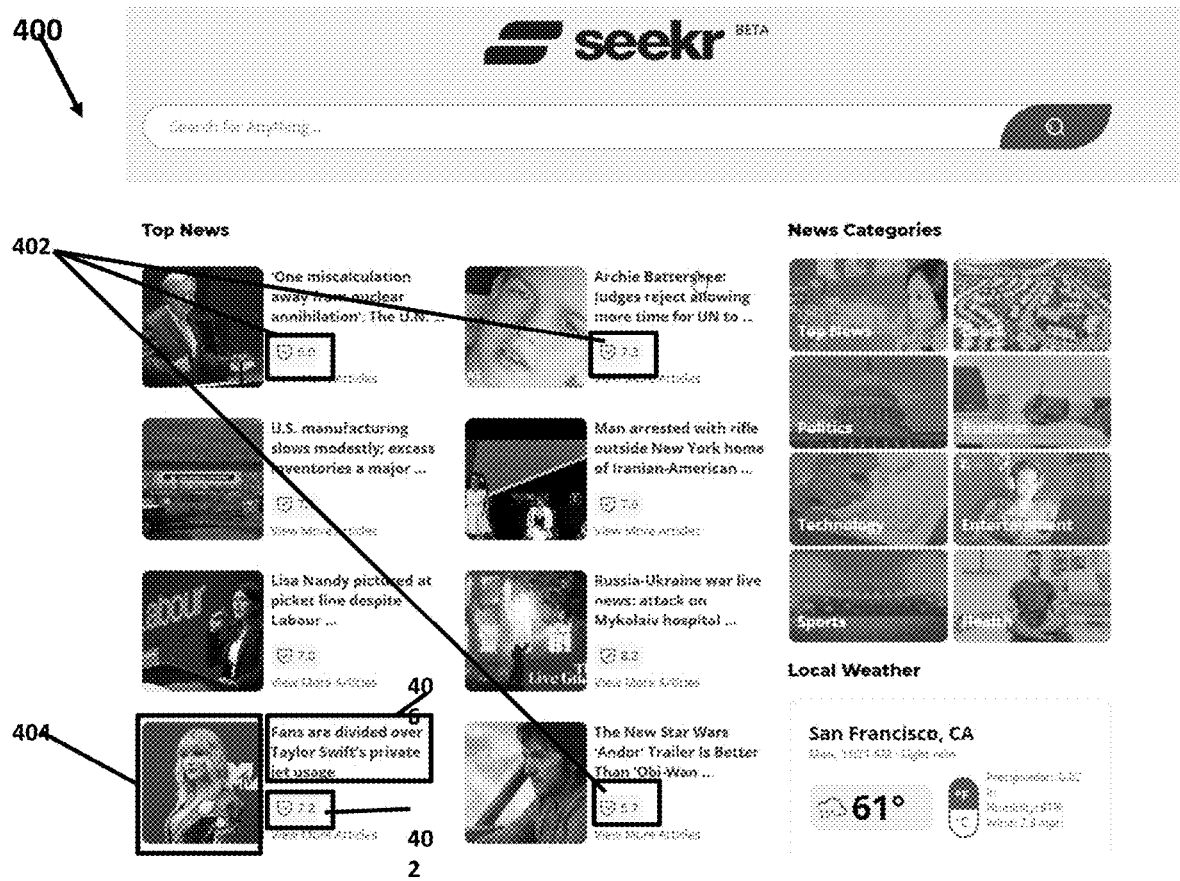
FIG. 4 illustrates an example landing page search user interface that includes a quality score.

FIG. 4 illustrates an example landing page search user interface 400 that includes a quality score. The landing page is similar to other known search engines that may provide a search bar and a set of categories that the user may select for particular categories of pieces of content. In this example shown, the user interface is for news types pieces of content. For each piece of content, the user interface may have a score 402 (just a quality score in this example, although the search user interface may also display just a political leaning score for political news or both the quality score and political leaning score for other pieces of content) associated with each piece of content. Each piece of content may have a squib that may include an thumbnail image 404 for the particular piece of content, a short summary 406 of the piece of content and the score 402. This user interface allows the user to quickly assess the quality of each piece of content with a higher numerical score indicating a better quality piece of content while a lower numerical score indicating a relatively worse quality piece of content. In each user interface shown in FIGS. 4-5 and 7, a user may click on the score for a piece of content and a detailed summary of the score (examples of which are shown in FIGS. 6 and 8) and its factors are shown to the user.

Figure 5:
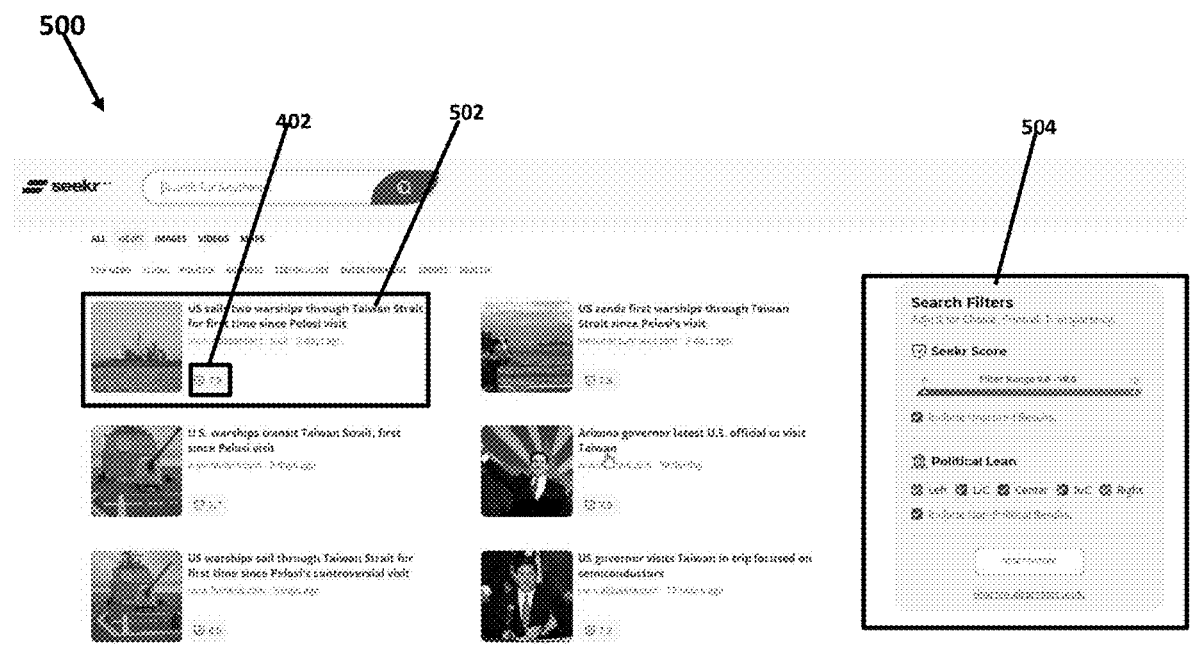
FIG. 5 illustrates an example of a news user interface showing pieces of content with a quality score.

FIG. 5 illustrates an example of a news user interface 500 showing pieces of content with the quality score 402. As in the previous user interface, each piece of content has a squib 502 that shows a brief summary of each piece of content including the score. Each user interface also may have a search filter portion 504 so the user may adjust the pieces of content returned to the user. For example, the user can adjust the desired level of quality score returned using a slider bar and/or request that unscored results are returned in the search results. In the system, only articles that are detected as obituaries and have very little to no content will be unscored. The user may also request pieces of content with a particular political lean and/or non-political pieces of content such as was shown in FIG. 4.

Figure 6:
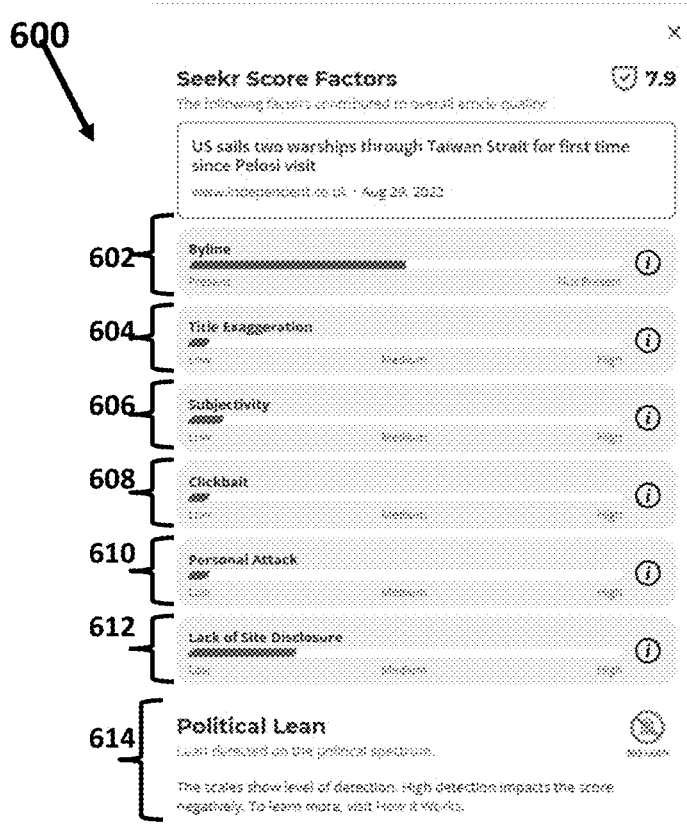
FIG. 6 illustrates an example of a detailed score user interface.

FIG. 6 illustrates an example of a detailed score user interface 600 that shows the details of the score associated with a particular piece of content and the score factors as determined by the document quality engine 310 in FIG. 3.

The user interface 600 may score the score of the piece of content and a summary of the piece of content and then the scoring factors including, for example, a byline factor 602 (a score factor indicating whether or not the piece of content names one or more authors since a piece of content without an author has less quality with a score between present or not present) and a title exaggeration factor 604 indicating whether the title overstates aspects of the story with the factor score being low, medium or high. The scoring factors also may include a subjectivity factor 606 that assesses whether the piece of content expresses points of view that go beyond the reporting facts with the factor score being low, medium or high and a clickbait factor 608 that assesses whether the title of the piece of content appeals to curiosity or emotion instead of describing the story with the factor score being low, medium or high. The scoring factors also may include a personal attack factor 610 that assesses whether a person is being attacked rather than the argument with the factor score being low, medium or high and a lack of site disclosure factor 612 that assesses whether the source of the piece of content shares mission, ownership and politics with the factor score being low, medium or high. Finally, a political lean score 614 is shown that detects lean on the political spectrum with no political lean for this piece of content as reflected by the fact that the user interface does not show a political lean score. As noted in the user interface, a higher factor score impacts the score negatively resulting in a lower quality score.

Figure 10:
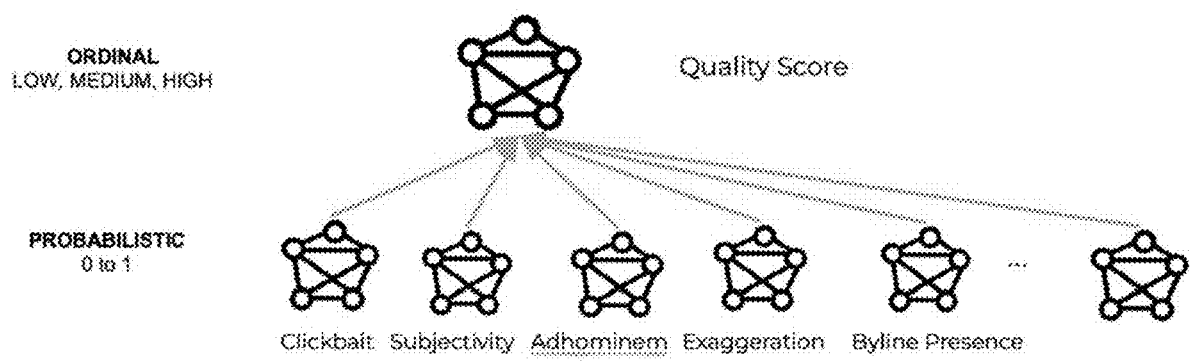
FIG. 10 illustrates an overall quality scoring method for the system.

For the scoring process for each article, the article may be first pre-processed and vectorized to identify the parts of the article. For this example, the article may be found at www.reuters.com/world/us/texas-town-struck-by-least-one-tornado-local-media-says-2023-06-16/which is incorporated herein by reference. Each article may then go through each of the neural network detector models as shown in FIG. 10. Examples of the different neural network detector models for the different journalistic principles may include "clickbait", "subjectivity", "adhominem", "Exaggeration", "Byline presence", etc. as shown in FIG. 10 or all of the models shown in FIG. 9. Each model will produce a confidence score between 0 and 1 that corresponds to the degree that each principle was violated. An example of the scoring by each journalistic principle model is shown in FIG. 9. The scores for each journalistic principle model, along with other information, like the topic of the article and the type of the article will be fed into another model (meta learning model discussed above) to produce the quality score as shown in FIG. 10. In this example, the scores went through the overall score model to give a final score of 1.6 for the exemplary article.

Figure 7:
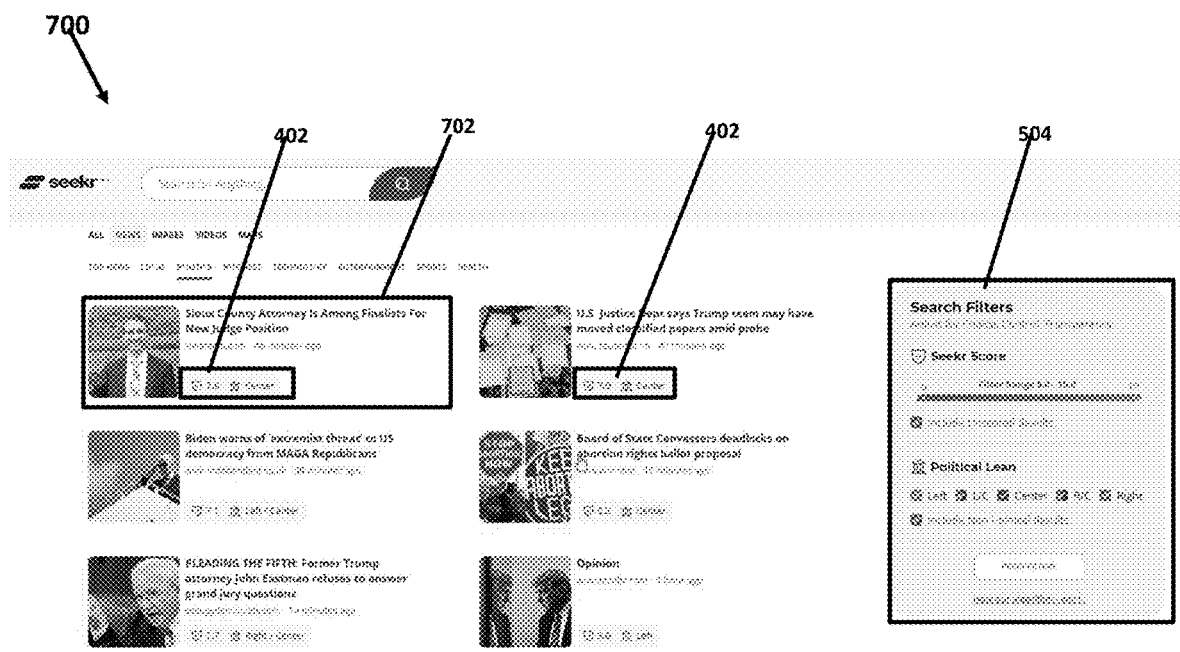
FIG. 7 illustrates an example of a politics search results with quality and political lean scores.
Figure 8:
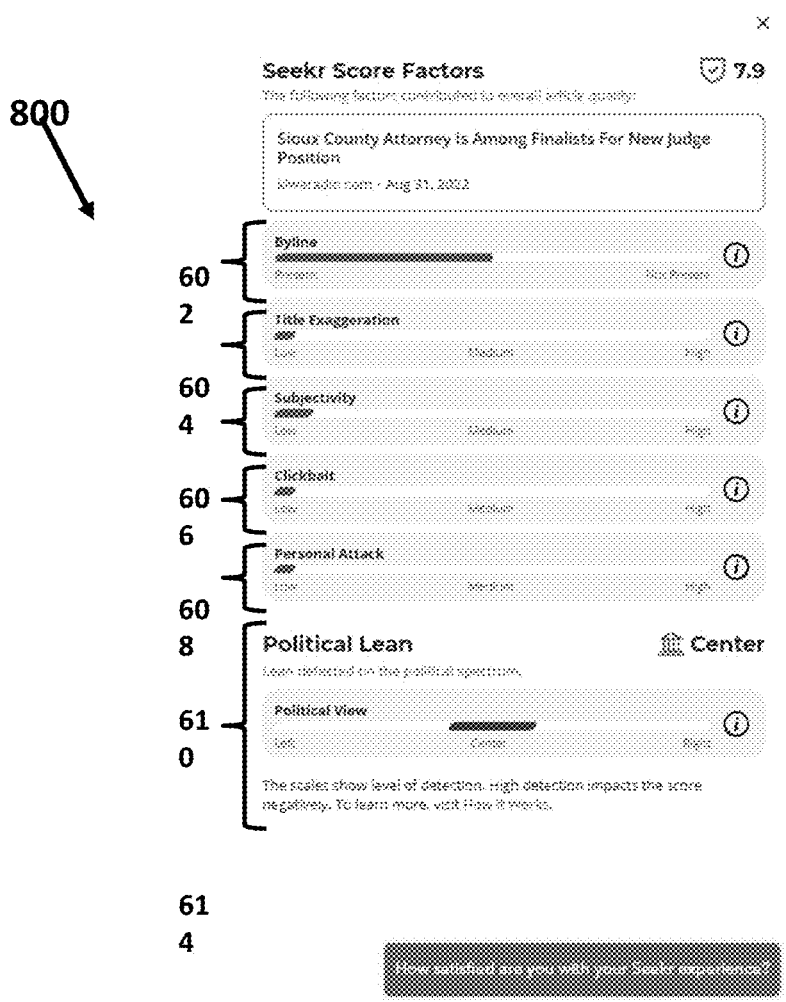
FIG. 8 illustrates an example of a detailed score user interface for both a quality score and political lean score.

FIG. 7 illustrates an example of a politics search results 700 with the score 403 that includes a quality score and a political lean score. This user interface has the same search filters portion 504 that allows the user to adjust the filters. FIG. 8 illustrates an example of a detailed score user interface 800 for both a quality score and political lean score. Note that in each detailed score user interface (FIGS. 6 and 8), only the score factors present for the piece of content are shown in the user interface. For example, as shown in FIG. 8, the lack of site disclosure factor does not appear. However, each of the other factors are shown with the factor score to arrive at the quality score. In this example, since the piece of content is a political piece of content, a political lean factor 614 score is shown with that may be left, center and right and result in the political lean categories (left, left/center (L/C), center, right/center (R/C) and Right) as shown in FIG. 7.

The foregoing description, for purpose of explanation, has been with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the disclosure and various embodiments with various modifications as are suited to the particular use contemplated.

The system and method disclosed herein may be implemented via one or more components, systems, servers, appliances, other subcomponents, or distributed between such elements. When implemented as a system, such systems may include and/or involve, inter alia, components such as software modules, general-purpose CPU, RAM, etc. found in general-purpose computers. In implementations where the innovations reside on a server, such a server may include or involve components such as CPU, RAM, etc., such as those found in general-purpose computers.

Additionally, the system and method herein may be achieved via implementations with disparate or entirely different software, hardware and/or firmware components, beyond that set forth above. With regard to such other components (e.g., software, processing components, etc.) and/or computer-readable media associated with or embodying the present inventions, for example, aspects of the innovations herein may be implemented consistent with numerous general purpose or special purpose computing systems or configurations. Various exemplary computing systems, environments, and/or configurations that may be suitable for use with the innovations herein may include, but are not limited to: software or other components within or embodied on personal computers, servers or server computing devices such as routing/connectivity components, handheld or laptop devices, multiprocessor systems, microprocessor-based systems, set top boxes, consumer electronic devices, network PCs, other existing computer platforms, distributed computing environments that include one or more of the above systems or devices, etc.

In some instances, aspects of the system and method may be achieved via or performed by logic and/or logic instructions including program modules, executed in association with such components or circuitry, for example. In general, program modules may include routines, programs, objects, components, data structures, etc. that perform particular tasks or implement particular instructions herein. The inventions may also be practiced in the context of distributed software, computer, or circuit settings where circuitry is connected via communication buses, circuitry or links. In distributed settings, control/instructions may occur from both local and remote computer storage media including memory storage devices.

The software, circuitry and components herein may also include and/or utilize one or more type of computer readable media. Computer readable media can be any available media that is resident on, associable with, or can be accessed by such circuits and/or computing components. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and can accessed by computing component. Communication media may comprise computer readable instructions, data structures, program modules and/or other components. Further, communication media may include wired media such as a wired network or direct-wired connection, however no media of any such type herein includes transitory media. Combinations of the any of the above are also included within the scope of computer readable media.

In the present description, the terms component, module, device, etc. may refer to any type of logical or functional software elements, circuits, blocks and/or processes that may be implemented in a variety of ways. For example, the functions of various circuits and/or blocks can be combined with one another into any other number of modules. Each module may even be implemented as a software program stored on a tangible memory (e.g., random access memory, read only memory, CD-ROM memory, hard disk drive, etc.) to be read by a central processing unit to implement the functions of the innovations herein. Or, the modules can comprise programming instructions transmitted to a general-purpose computer or to processing/graphics hardware via a transmission carrier wave. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level performance and cost.

As disclosed herein, features consistent with the disclosure may be implemented via computer-hardware, software, and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the logic, may also be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) though again does not include transitory media. Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the invention have been specifically described herein, it will be apparent to those skilled in the art to which the invention pertains that variations and modifications of the various implementations shown and described herein may be made without departing from the spirit and scope of the invention. Accordingly, it is intended that the invention be limited only to the extent required by the applicable rules of law.

While the foregoing has been with reference to a particular embodiment of the disclosure, it will be appreciated by those skilled in the art that changes in this embodiment may be made without departing from the principles and spirit of the disclosure, the scope of which is defined by the appended claims.

What is claimed is:

1. A search system, comprising:
 a computer system having a processor and a plurality of lines of instructions that are executed by the processor that is configured to:
  retrieve a plurality of pieces of content;
  generate, using a separate machine learning process for each journalistic principle score factor, a plurality of journalistic principle score factors for each piece of content of the plurality of pieces of content;
  generate, using a tree ensemble learning model trained on a set of teaching scenarios, a quality score for each piece of content based on the plurality of journalistic principle score factors, wherein the quality score for each piece of content is adapted to non-linear dependencies in each piece of content by the tree ensemble learning model that adjusts a particular generated journalistic principle score factor for a particular piece of content;
  store, for each piece of content, the quality score and a political lean score, the quality score indicating a quality of the piece of content and the political lean score indicating a political bias of the piece of content;
  receive a search query having one or more query terms;
  retrieve one or more pieces of content that match the one or more query terms; and
  generates a search user interface having a summary of each of the matching one or more pieces of content and the stored quality score and the political lean score for each matching piece of content.

2. The system of claim 1, wherein the processor is further configured to crawl a corpus of pieces of content and ingest the crawled pieces of content.

3. The system of claim 1, wherein the processor is further configured to generate a search factors user interface that displays the plurality of journalistic principle score factors that together generate the quality score.

4. The system of claim 3, wherein the plurality of journalistic principle score factors include a byline factor, a title exaggeration factor, a subjectivity factor, a clickbait factor, a personal attack factor and a site disclosure factor.

5. The system of claim 1, wherein the processor is further configured to generate a filter user interface to adjust the matching pieces of content.

6. The system of claim 1, wherein each piece of content is a news piece of content.

7. The system of claim 1, wherein the processor is further configured to aggregate, using a meta learning model, the journalistic principle score for each of the plurality of journalistic score factors for the piece of content to generate the quality score of the piece of content.

8. The system of claim 1, wherein the plurality of journalistic principle score factors include a byline factor, a title exaggeration factor, a subjectivity factor, a clickbait factor, a personal attack factor and a site disclosure factor.

9. A search method comprising:
 retrieving, at a search system, a plurality of pieces of content;
 generating, using a separate machine learning model for each journalistic principle score factor, a plurality of journalistic principle score factors for each piece of content of the plurality of pieces of content;
 generating, using a tree ensemble learning model trained on a set of teaching scenarios, a quality score for each piece of content based on the plurality of journalistic principle score factors, wherein the quality score for each piece of content is adapted to non-linear dependencies in each piece of content by the tree ensemble learning model that adjusts a particular generated journalistic principle score factor for a particular piece of content;
 storing, at a search system, the quality score and a political lean score, the quality score indicating a quality of the piece of content and the political lean score indicating a political bias of the piece of content;
 receiving, at the search system, a search query having one or more query terms;

retrieving, at the search system, one or more pieces of content that match the one or more query terms; and displaying, on a display of a computer, a search user interface having a summary of each of the matching one or more pieces of content and the generated quality score and the political lean score for each matching piece of content.

10. The method of claim 9 further comprising crawling a corpus of pieces of content and ingesting the crawled pieces of content.

11. The method of claim 9, wherein displaying the generated quality score further comprises displaying the plurality of score factors that together generate the quality score.

12. The method of claim 11, wherein the plurality of score factors are journalistic principle score factor and the journalistic principle score factors include a byline factor, a title exaggeration factor, a subjectivity factor, a clickbait factor, a personal attack factor and a site disclosure factor.

13. The method of claim 9, wherein displaying the generated quality score further comprises displaying a filter user interface to adjust the matching pieces of content.

14. The method of claim 9, wherein each piece of content is a news piece of content.

15. The method of claim 9, wherein generating the quality score for the piece of content further comprises aggregating, using a meta learning model, the journalistic principle score factors for each of the plurality of journalistic principle for the piece of content to generate the quality score of the piece of content.

16. The method of claim 9, wherein the plurality of journalistic principle score factors include a byline factor, a title exaggeration factor, a subjectivity factor, a clickbait factor, a personal attack factor and a site disclosure factor.

17. An apparatus for generating a score for a piece of content a computer system having a processor and a plurality of lines of instructions that are executed by the processor that is configured to:

retrieve a plurality of pieces of content;

generate a plurality of journalistic principle score factors for each piece of content of the plurality of pieces of content;

generate, using a tree ensemble learning model trained on a set of teaching scenarios, a quality score for each piece of content based on the plurality of journalistic principle score factors, wherein the quality score for each piece of content is adapted to non-linear dependencies in each piece of content by the tree ensemble learning model that adjusts a particular generated journalistic principle score factor for a particular piece of content;

store, for each piece of content, the quality score and a political lean score, the quality score indicating a quality of the piece of content and the political lean score indicating a political bias of the piece of content; and wherein the quality score is generated by the processor being further configured to generate, using a machine learning model for each journalistic principle, the journalistic principle score factor for each journalistic principle for the piece of content.

18. The apparatus of claim 17, wherein the processor is further configured to crawl a corpus of pieces of content and ingest the crawled pieces of content.

19. The apparatus of claim 17, wherein the processor is further configured to generate a filter user interface to adjust the matching pieces of content.

20. The apparatus of claim 17, wherein each piece of content is a news piece of content.

21. The apparatus of claim 17, wherein the plurality of journalistic principle score factors include a byline factor, a title exaggeration factor, a subjectivity factor, a clickbait factor, a personal attack factor and a site disclosure factor.

* * * * *

UNITED STATES PATENT AND TRADEMARK OFFICE
CERTIFICATE OF CORRECTION

| | | |
|---|---|---|
| PATENT NO. | : 12,174,903 B1 | Page 1 of 1 |
| APPLICATION NO. | : 18/582111 | |
| DATED | : December 24, 2024 | |
| INVENTOR(S) | : Stefanos Poulis, Robin J. Clark and Patrick C. Condo | |

It is certified that error appears in the above-identified patent and that said Letters Patent is hereby corrected as shown below:

On the Title Page

On item (72) Inventors, correct the second inventor's name from "Robin K. Clark" to --Robin J. Clark--.

On item (72) Inventors, correct the third inventor's name from "Patrick K. Condo" to --Patrick C. Condo--.

Signed and Sealed this
Twenty-seventh Day of January, 2026

John A. Squires
*Director of the United States Patent and Trademark Office*